United States Patent Office 3,787,512
Patented Jan. 22, 1974

3,787,512
PREPARATION OF AROMATIC HYDROCARBONS
Gunner E. Nelson, Baton Rouge, La., assignor to
Ethyl Corporation, Richmond, Va.
No Drawing. Continuation-in-part of application Ser. No. 813,340, Apr. 3, 1969, which is a continuation-in-part of application Ser. No. 598,779, July 29, 1966, both now abandoned. This application Mar. 10, 1971, Ser. No. 123,037
Int. Cl. C07c 15/12
U.S. Cl. 260—668 C                            11 Claims

ABSTRACT OF THE DISCLOSURE

Process for alkylating an aromatic hydrocarbon by reacting a haloalkane with either benzene or an alkyl benzene and conducting the reaction in the presence of an alkylaluminum halide catalyst without deliberately adding heat to elevate the temperature of the reaction.

CROSS-REFERENCE TO RELATED APPLICATION

This application is a continuation-in-part of application Ser. No. 813,340, filed Apr. 3, 1969, which is a continuation-in-part of application Ser. No. 568,779, filed July 29, 1966, both of which are now abandoned.

BACKGROUND OF THE INVENTION

This invention relates to the preparation of aromatic hydrocarbons through use of aluminum alkyl halides as Friedel-Crafts catalysts. By way of example, this invention concerns a method for forming an $\omega$-haloalkylbenzene or a p-alkyl-$\omega$-haloalkylbenzene by reacting an $\alpha,\omega$-dihaloalkane with, respectively, benzene or an alkylbenzene in the presence of a diluent and an aluminum alkyl halide catalyst. Further, this invention concerns a method for forming an $\alpha,\omega$-diphenylalkane or an $\alpha,\omega$(p,p'-alkyldiphenyl)alkane by reacting an $\alpha,\omega$-dihaloalkane with respectively benzene or an alkylbenzene in the presence of an aluminum alkyl halide catalyst. In addition, this invention provides a method for forming a monoalkylbenzene by reacting a monohalalkane with, respectively, benzene or an alkyl benzene in the presence of a diluent and an aluminum alkyl halide catalyst; absence of a diluent leads to the formation of other polyalkylbenzenes. Other alkylation reactions contemplated by the present invention will become apparent from the following description.

The compounds developed by the process of the present invention find use both as scavengers for alkyl lead antiknock agents (see U.S. Pats. 1,668,022 and 2,398,281) and as pesticides when properly applied as a spray or dusting powder.

The prior art has been beset with two major problems in reactions of the types involved in the present invention, namely, yield of the desired products has been quite low and reaction temperatures have been necessarily quite high, thus increasing the number of undesirable impurities in the product. Prior art reactions have been conducted using conventional Friedel-Crafts catalysts such as, for example, aluminum chloride. Literature references involving such standard Friedel-Crafts catalysts report temperature requirements of 70° C. and higher.

A purpose of the present invention is to overcome the above-noted disadvantages of the prior art. More specifically, a purpose of the present invention is to produce high yields of the desired aromatic hydrocarbons while conducting the requisite chemical reactions at economically low temperatures. Further advantages and purposes of the present invention will become apparent in the following description.

SUMMARY OF THE INVENTION

The present invention provides a process for alkylating an aromatic hydrocarbon by reacting a haloalkane with a compound selected from the group consisting of benzene and alkyl benzenes comprising conducting the reaction in the presence of an alkylaluminum halide catalyst and avoiding the deliberate addition of heat to elevate the reaction temperature.

DESCRIPTION OF THE PREFERRED EMBODIMENTS

The present invention is drawn to several species of alkylation reactions, four of which utilize an $\alpha,\omega$-dihaloalkane as one reactant and either benzene or an alkylbenzene as the other reactant. Two species of the reactions which produce, respectively, an $\omega$-haloalkylbenzene when benzene is a reactant and a p-alkyl-$\omega$-haloalkylbenzene when an alkylbenzene is reactant, utilize an organic diluent. Another two species of the reactions which produce, respectively, an $\alpha,\omega$-diphenylalkane when benzene is a reactant and $\alpha,\omega$-(p,p'-alkylidphenyl)alkane when an alkylbenzene is a reactant, do not utilize a diluent. Still another two species of the reactions, which employ a monohaloalkane as one reactant and either benzene or an alkylbenzene as the other reactant to produce, respectively, a monoalkylbenzene or polyalkylbenzene, also employ a diluent; absence of the diluent in either of these two reactions leads to the formation of other polyalkylbenzenes. The remaining species of the reactions are similar to the first four reactions with the exception of employing $\alpha,\omega$-dihaloalkanes having different halogens or polyhaloalkanes having more than three halogens which are the same or different. All of the reactions employ as a catalyst one or a combination of dialkylaluminum halide and/ or alkylaluminum dihalide.

Preferred reactions are first, the reaction of 1,2-dichloroethane with benzene in the presence of an organic diluent and methylaluminum sesquichloride to produce $\beta$-chloroethylbenzene; second, the reaction of 1,2-dichloroethane with toluene in the presence of an organic diluent and methylaluminum sesquichloride to produce p-methyl-$\beta$-chloroethylbenzene; third, the reaction of 1,2-dichloroethane with benzene in the presence of methylaluminum sesquichloride to produce 1,2-diphenylethane; fourth, the reaction of 1,2-dichloroethane with toluene in the presence of methylaluminum sesquichloride to produce 1,2-(p,p'-methyldiphenyl)ethane; fifth, the reaction of methyl chloride with benzene in the presence of methylaluminum sesquichloride and a diluent to produce toluene; and sixth, the reaction of methyl chloride with toluene in the presence of methylaluminum sesquichloride and a diluent to produce 1,4-dimethylbenzene. The order of stating the reactions above does not indicate an order of preference.

The improvement of the present invention flows primarily from the use in alkylation reactions of alkylaluminum halide catalysts, a preferred catalyst being methylaluminum sesquihalide, which is a mixture of dimethylaluminum halide and methylaluminum dihalide. The organoaluminum catalysts employed in this invention include compounds having the formula $R_nAlX_{1-n}$ wherein R represents a hydrocarbon selected from the group consisting of alkyl and aryl radicals, X represents a halogen selected from the group consisting of chlorine, bromine and iodine, and $n$ represents an integer not greater than 3. Thus, the invention contemplates the use of all organoaluminum halides of the type $RAlX_2$ and $R_2AlX$ and mixtures of the same (e.g. sesquihalides). In compounds of the $R_2AlX$ type, the R groups may be the same or different, e.g. $(CH_3)(C_2H_5)AlX$. These catalysts cause the above reactions to proceed at a relatively fast rate at comparatively low temperatures which need not exceed room temperatures, and thus, no heating is required in the present invention as is generally required as taught by the prior art. Conventional Friedel-Crafts catalysts, such as aluminum chloride, not only require supplying heat to the reaction but tend to remain in suspension in the reactants thus leading to slow reactions. On the other hand, alkylaluminum halide catalysts are readily soluble in the reactants and are conducive to fast reactions, good conversions and high yields. The molar ratio of reactants to catalyst may range from about 0.05 to 0.1 to about 5 to 0.1; preferably it will range from about 0.1 to 1.0 to about 2 to 0.1. In continuous operation processes, the catalysts of the present invention may be easily recovered and recycled for continuing use.

Numerous diluents are suitable for those reactions of the present invention which require a diluent. Typical organic diluents are ligroin, nitrobenzene, carbon disulfide, hexane, and isooctane. In general, all paraffinic hydrocarbons which are liquid at reaction temperature are suitable. All useful diluents must be liquid at reaction temperatures and inert to the reactants of the present invention. Generally, 50 percent to 80 percent by volume of the reactant solution is diluent.

A broad range of monohaloalkanes are useful in some of the reactions of the invention. Exemplary are compounds having up to about 20 carbon atoms, e.g., methyl chloride, methyl bromide, ethyl chloride, propyl bromide, butyl chloride, pentyl bromide, decyl bromide, 6-methyl-1-chlorodecane, and the like. Preferred haloalkanes have from 2 up to about 4 carbon atoms.

A comparatively wide variety of $\alpha,\omega$-dihaloalkane reactants may be used in some of the present invention. Typical $\alpha,\omega$ dihaloalkanes have from 2 up to about 20 carbon atoms and include such compounds as 1,2-dichloroethane, 1,2-dibromoethane, 1,2-diiodoethane, 1,2-dichloropropane, 1,4-dichlorobutane, and 1,2-dichloro-2-methylpropane, 1,5-dichloropentane, 1,8-dibromooctane, 1,10-dichlorodecane, 1,10-dibromo-6-ethyldecane, and the like. Preferred $\alpha,\omega$-dihaloalkanes have from about 2 up to about 4 carbon atoms, with the most preferred $\alpha,\omega$-dihaloalkane being 1,2-dichloroethane.

Polyhaloalkanes other than $\alpha,\omega$-dihaloalkanes having two or more halogens which may be the same or different are also useful in the practice of the invention. Such haloalkanes preferably have from 1 up to about 20 carbons and preferably up to about 4 carbon atoms. Exemplary are chloroform, bromoform, methylene chloride, methyl chloroform, 1,1,2-trichloroethane, 1,1,2,2-tetraiodoethane, 1,1,1,2-tetrabromoethane, 1,2-(p,p'-methyldiphenyl)ethane, 1,1,3-trichloropropane, 1,1,4-triiodobutane, 1,1,10-trichlorodecane, chlorobromoethane, 1-chloro-3-bromo-6-iodohexane, and the like.

The present invention also lends itself to a relatively wide variety of alkylbenzene reactants having from 7 up to about 30 carbon atoms and preferably up to about 10 carbon atoms; such reactants may include one or several alkyl radicals which are the same or different. Typical alkylbenzenes include toluene, ethylbenzene, p-ethylpropylbenzene, propylbenzene, butylbenzene, isopropylbenzene, isobutylbenzene and decylbenzene, with a preferred alkylbenzene being toluene.

Having thus set forth the present invention, the following examples are presented as being further descriptive of the present invention, though not as limiting thereof:

EXAMPLE I

One mol of benzene was reacted with 0.2 mol of 1,2-dichloroethane in the presence of 0.1 mol of methylaluminum sesquichloride and a hexane diluent at 25° C. to produce predominantly $\beta$-chloroethylbenzene.

EXAMPLE II

One mol of benzene was reacted with 0.5 mol of 1,2-dichloroethane in the presence of 0.2 mole of methylaluminum sesquichloride at 25° C. to produce a 80 percent yield of 1,2-diphenylethane.

EXAMPLE III

One mol of toluene was reacted with 0.2 mol of 1,2-dichloroethane in the presence of 0.1 mol of methylaluminum sesquichloride and a hexane diluent at 25° C. to produce predominantly p-methyl-$\beta$-chloroethylbenzene.

EXAMPLE IV

One mol of toluene was reacted with 0.5 mol of 1,2-dichloroethane in the presence of 0.2 mol of methylaluminum sesquichloride at 25° C. to produce predominantly 1,2-(p,p'-methyldiphenyl)ethane.

The following examples may be carried out under the listed conditions to yield predominantly the product noted.

| Example number | Reactants | Catalyst | Temperature, °C. | Diluent | Product |
|---|---|---|---|---|---|
| V | Benzene plus 1,2-dibromoethane | Methylaluminum sesquibromide | 25 | Isooctane | $\beta$-Bromoethylbenzene. |
| VI | do | do | 25 | None | 1,2-diphenylethane. |
| VII | Toluene plus 1,2-dibromoethane | do | 25 | Hexane | p-Methyl-$\beta$-bromoethylbenzene. |
| VIII | do | do | 25 | None | 1,2-(p,p'-methyldiphenyl)ethane. |
| IX | Benzene plus 1,3-dichloropropane | Methylaluminum sesquichloride | 25 | Isooctane | $\gamma$-Chloropropylbenzene. |
| X | do | do | 25 | None | 1,3-diphenylpropane. |
| XI | Benzene plus 1,4-dichlorobutane | do | 25 | Hexane | $\delta$-Chlorobutylbenzene. |
| XII | do | do | 25 | None | 1,4-diphenylbutane. |
| XIII | Ethylbenzene plus 1,2-dichloroethane | do | 25 | Hexane | p-Ethyl-$\beta$-chloroethylbenzene. |
| XIV | do | do | 25 | None | 1,2-(p,p'-ethyldiphenyl)ethane. |
| XV | Propylbenzene plus 1,2-dichloroethane | do | 25 | Hexane | p-Propyl-$\beta$-chloroethylbenzene. |
| XVI | do | do | 25 | None | 1,2-(p,p'-propyldiphenyl)ethane. |
| XVII | Butylbenzene plus 1,2-dichloroethane | do | 25 | Hexane | p-Butyl-$\beta$-chloroethylbenzene. |
| XVIII | do | do | 25 | None | 1,2-(p,p'-butyldiphenyl)ethane. |
| XIX | Butylbenzene plus 1,4-dichlorobutane | do | 25 | Hexane | p-Butyl-4-chlorobutylbenzene. |
| XX | do | do | 25 | None | 1,4-(p,p'-butyldiphenyl)butane. |
| XXI | Benzene plus 1,10-diiododecane | Decylaluminum sesquiiodide | 0 | Ligroin | $\kappa$-iododecylbenzene. |
| XXII | Decylbenzene plus 1,10-dibromodecane | Decylaluminum dibromide | 5 | Nitrobenzene | p-Methyl-$\kappa$-bromodecylbenzene. |
| XXIII | Benzene plus 1,10-dichlorodecane | Decylaluminum sesquichloride | 10 | None | 1,10-diphenyldodecane. |
| XXIV | Decylbenzene plus 1,10-dichlorododecane | Ethylaluminum sesquibromide | 15 | None | 1,10-(p,p'-decyldiphenyl)decane. |
| XXV | Benzene plus 1,7-diiodoheptane | Ethylaluminum diiodide | 20 | Carbon disulfide. | $\eta$-Iodoheptylbenzene. |
| XXVI | Heptylbenzene plus 1,7-dichloroheptane | Diethylaluminum chloride | 30 | Hendecane | 1,7-(p,p'-heptyldiphenyl)heptane. |
| XXVII | Benzene plus 1,6-dibromohexane | Propylaluminum sesquibromide | 35 | None | 1,6-diphenylhexane. |
| XXVIII | Hexylbenzene plus 1,8-dichlorooctane | Butylaluminum sesquichloride | 40 | do | 1,8-(p,p'-hexyldiphenyl)octane. |
| XXIX | Benzene plus methylchloride | Dodecylaluminum dichloride | 0 | Decane | Toluene. |
| XXX | Benzene plus methylene chloride | Methylaluminum sesquichloride | 40 | None | Diphenylmethane. |
| XXXI | Benzene plus ethyl chloride | Ethylaluminum sesquichloride | 10 | Ligroin | Ethylbenzene. |
| XXXII | Benzene plus propyl bromide | Methylaluminum dibromide | 30 | Nitrobenzene | Propylbenzene. |

TABLE—Continued

| Example number | Reactants | Catalyst | Temperature, °C | Diluent | Product |
|---|---|---|---|---|---|
| XXXIII | Benzene plus butyl iodide | Propylaluminum sesquichloride | 5 | Carbon disulfide | Butylbenzene. |
| XXXIV | Benzene plus decyl chloride | Octylaluminum dichloride | 2 | Hexane | Decylbenzene. |
| XXXV | Decylbenzene plus methyl chloride | Dimethylaluminum chloride | 12 | Heptane | p-Decyl-methylbenzene. |
| XXXVI | Toluene plus ethyl chloride | Butylaluminum sesquichloride | 28 | Octane | p-Methyl-ethylbenzene. |
| XXXVII | Ethylbenzene plus methylene chloride | Hendecylaluminum sesquichloride | 35 | None | Diethyldiphenylmethane. |
| XXXVIII | Propylbenzene plus propyl bromide | Dodecylaluminum dibromide | 16 | Ligroin | p-Propyl-propylbenzene. |
| XXXIX | Butylbenzene plus methyl chloride | Methylaluminum sesquichloride | 20 | Nitrobenzene | p-Butyl-methylbenzene. |
| XL | Decylbenzene plus decyl iodide | Methylaluminum sesquiiodide | 25 | Hexane | p-Decyl-decylbenzene. |
| XLI | Benzene plus chloroform | Methylaluminum sesquichloride | 0 | Heptane | $\alpha,\alpha$-Dichlorotoluene. |
| XLII | Benzene plus methylene iodide | Ethylaluminum sesquichloride | 40 | Hexane | Diphenylmethane. |
| XLIII | Benzene plus methyl chloroform | Propylaluminum sesquichloride | 33 | None | $\alpha$-Methyl-$-chloro-diphenylmethane. |
| XLIV | Benzene plus 1,1,3,3-tetrabromopropane | Dipropylaluminum bromide | 26 | Decane | 1,1,3,3-tetraphenylpropane. |
| XLV | Benzene plus 1,1,10,10-tetraiododecane | Decylaluminum diiodide | 5 | Ligroin | 1,1,10,10-tetraphenyldecane. |
| XLVI | Toluene plus chloroform | Methylaluminum dichloride | 8 | Nitrobenzene | $\alpha$-Chloro-di-p-tolymethane. |
| XLVII | Toluene plus methylene bromide | Dimethylaluminum bromide | 29 | None | Di-p-tolymethane. |
| XLVIII | Benzene plus chlorobromoethane | Ethylaluminum sesquibromide | 1 | Isooctane | $\beta$-Chloroethylbenzene. |
| XLIX | p-Ethyl-n-propylbenzene plus methyl chloride | Methylaluminum sesquichloride | 38 | Hexane | 1-methyl-4-ethyl-n-propylbenzene. |

What is claimed is:

1. A process for the production of $\alpha,\omega$-diphenylalkanes by reacting, in a diluent-free system and in the presence of an alkylaluminum halide catalyst, an $\alpha,\omega$-polyhaloalkane and benzene wherein said polyhaloalkane contains from 2 to about 20 carbon atoms and wherein said polyhaloalkane contains halogens selected from the group consisting of chlorine, bromine and iodine.

2. The process of claim 1 wherein said polyhaloalkane is an $\alpha,\omega$-dihaloalkane.

3. The process of claim 1 wherein said polyhaloalkane is 1,2-dichloroethane.

4. The process of claim 1 wherein said alkylaluminum halide catalyst is methylaluminum sesquichloride.

5. The process of clim 1 wherein said polyhaloalkane is 1,2-dichloroethane, and wherein said alkylaluminum catalyst is methylaluminum sesquichloride.

6. A process for the production of $\alpha,\omega$-(p,p'-alkyl-diphenyl)alkane by reacting, in a diluent-free system and in the presence of an alkylaluminum halide catalyst, an $\alpha,\omega$-polyhaloalkane and an alkylbenzene wherein said polyhaloalkane contains from 2 to about 20 carbon atoms, wherein said polyhaloalkane contains halogens selected from the group consisting of chlorine, bromine and iodine and wherein said alkylbenzene contains from 7 to about 30 carbon atoms.

7. The process of claim 6 wherein said alkylbenzene is toluene.

8. The process of claim 6 wherein said polyhaloalkane is an $\alpha,\omega$-dihaloalkane.

9. The process of claim 6 wherein said polyhaloalkane is 1,2-dichloroethane and wherein said alkylbenzene is toluene.

10. The process of claim 6 wherein said alkylaluminum halide catalyst is methylaluminum sesquichloride.

11. The process of claim 6 wherein said polyhaloalkane is 1,2-dichloroethane, wherein said alkylbenzene is toluene, and wherein said alkylaluminum catalyst is methylaluminum sesquichloride.

References Cited

UNITED STATES PATENTS

| | | |
|---|---|---|
| 2,794,822 | 6/1957 | Schweitzer _____ 260—668 C |
| 3,301,514 | 4/1962 | Kosmin _____ 260—671 C |
| 3,094,568 | 6/1963 | Hay et al. _____ 260—671 C. |
| 3,277,196 | 10/1966 | Winkler _____ 260—671 P |
| 3,312,748 | 4/1967 | Johnson _____ 260—671 R |
| 2,355,850 | 8/1944 | Driesbech _____ 260—651 HA |
| 2,308,419 | 1/1943 | Heitz et al. _____ 260—651 HA |
| 2,631,172 | 3/1953 | Schmerling _____ 260—651 HA |
| 2,388,428 | 11/1945 | Mauity _____ 260—448 A |

OTHER REFERENCES

Schmerling et al., J.A.C.S., 79, pp. 2636–42, May 20, 1957.

CURTIS R. DAVIS, Primary Examiner

U.S. Cl. X.R.

260—651 HA, 671 B, 671 C, 671 P